(12) United States Patent
Gouessant et al.

(10) Patent No.: US 7,096,035 B2
(45) Date of Patent: Aug. 22, 2006

(54) PROCESS AND DEVICE FOR MONITORING THE TRANSMISSION POWER OF A MOBILE TERMINAL, FOR EXAMPLE A CELLULAR MOBILE TELEPHONE, IN PARTICULAR CAPABLE OF OPERATING ACCORDING TO THE UMTS STANDARD

(75) Inventors: Philippe Gouessant, La Garenne Colombes (FR); Thierry Arnaud, Poisy (FR)

(73) Assignee: STMicroelectronics N.V., Amsterdam (NL)

( * ) Notice: Subject to any disclaimer, the term of this patent is extended or adjusted under 35 U.S.C. 154(b) by 473 days.

(21) Appl. No.: 10/113,958

(22) Filed: Apr. 1, 2002

(65) Prior Publication Data

US 2002/0176513 A1 Nov. 28, 2002

(30) Foreign Application Priority Data

Apr. 2, 2001 (EP) ................................. 01107740

(51) Int. Cl.
*H04Q 7/20* (2006.01)

(52) U.S. Cl. ..................... 455/522; 455/574; 455/127.1

(58) Field of Classification Search ................ 455/522, 455/125, 126, 127.1, 127.2, 232.1, 239.1, 455/240.1, 245.1, 247.1, 574; 370/311

See application file for complete search history.

(56) References Cited

U.S. PATENT DOCUMENTS

| | | | | |
|---|---|---|---|---|
| 5,267,262 A * | 11/1993 | Wheatley, III | ............... | 455/522 |
| 5,673,286 A | 9/1997 | Lomp | .......................... | 375/208 |
| 5,752,172 A * | 5/1998 | Matero | ..................... | 455/127.3 |
| 6,043,712 A * | 3/2000 | Leizerovich et al. | ......... | 330/279 |
| 6,166,598 A * | 12/2000 | Schlueter | ..................... | 330/127 |
| 6,253,092 B1 * | 6/2001 | Nguyen et al. | ............. | 455/522 |
| 6,259,682 B1 * | 7/2001 | Brown et al. | ................ | 370/311 |
| 6,327,462 B1 * | 12/2001 | Loke et al. | .............. | 455/127.2 |
| 6,434,373 B1 * | 8/2002 | Ichihara | .................... | 455/127.5 |
| 6,493,326 B1 * | 12/2002 | Ramachandran | ............ | 370/311 |
| 6,510,142 B1 * | 1/2003 | Kinnavy et al. | ............. | 370/311 |
| 6,542,029 B1 * | 4/2003 | Khesbak et al. | ............. | 330/129 |
| 6,711,389 B1 * | 3/2004 | Medl et al. | ............... | 455/127.2 |
| 6,711,391 B1 * | 3/2004 | Walker et al. | ........... | 455/234.1 |
| 6,748,201 B1 * | 6/2004 | Black et al. | .............. | 455/240.1 |
| 6,876,874 B1 * | 4/2005 | Arnaud et al. | .............. | 455/574 |

FOREIGN PATENT DOCUMENTS

EP 0859464 8/1998

* cited by examiner

*Primary Examiner*—Sonny Trinh
(74) *Attorney, Agent, or Firm*—Lisa K. Jorgenson; Allen, Dyer, Doppelt, Milbrath & Gilchrist, P.A.

(57) ABSTRACT

The transmission power of a cellular mobile telephone is adjusted as a function of received power information. The celluar mobile telephone is equipped with a variable-gain amplifier that covers the transmission power range, and the gain and supply voltage of the amplifier are tuned as a function of the received power information.

35 Claims, 11 Drawing Sheets

PROCESS AND DEVICE FOR MONITORING THE TRANSMISSION POWER OF A MOBILE TERMINAL, FOR EXAMPLE A CELLULAR MOBILE TELEPHONE, IN PARTICULAR CAPABLE OF OPERATING ACCORDING TO THE UMTS STANDARD

FIELD OF THE INVENTION

The present invention relates to wireless communication systems, and more particularly, to a wireless communication system operating according to the universal mobile telecommunications system (UMTS) standard.

BACKGROUND OF THE INVENTION

In a wireless communication system, a base station communicates with a plurality of remote terminals, such as cellular mobile telephones. Frequency division multiple access (FDMA) and time division multiple access (TDMA) are the traditional multiple access schemes for delivering simultaneous services to a number of terminals. The basic idea underlying the FDMA and TDMA systems is sharing the available resource in such a way that several terminals can operate simultaneously without causing interference. For an FDMA system several frequencies are shared, and for a TDMA system several time intervals are shared.

Telephones operating according to the GSM standard belong to the FDMA and TDMA systems in the sense that transmission and reception are performed at different frequencies and also at different time intervals.

In contrast to these systems using frequency division or time division, the CDMA (Code Division Multiple Access) systems allow multiple users to share a common frequency and a common time channel by using coded modulation. CDMA systems include the CDMA 2000 system, the WCDMA system (Wide Band CDMA) and the IS-95 standard.

In CDMA systems, as is well known to the person skilled in the art, a scrambling code is associated with each base station, and this makes it possible to distinguish one base station from another. Furthermore, an orthogonal code, known by the person skilled in the art as an OVSF code, is allotted to each remote terminal (such as for a cellular mobile telephone, for example). All the OVSF codes are mutually orthogonal, thus making it possible to distinguish one remote terminal from another.

Before sending a signal over the transmission channel to a remote terminal, the signal has been scrambled and spread by the base station using the scrambling code of the base station and the OVSF code of the remote terminal. In CDMA systems, it is again possible to distinguish between those which use a distinct frequency for transmission and reception (CDMA-FDD system) and those which use a common frequency for transmission and reception, but distinct time domains for transmission and reception (CDMA-TDD system).

The invention applies advantageously to communication systems of the CDMA type, and more particularly to systems of the CDMA-FDD type. The invention applies also to communication systems of the FDMA and TDMA type, in particular to GSM and GPRS telephones, and more generally to terminals operating according to the UMTS standard which must be capable of operating both under a CDMA system, like the WCDMA system, and under the FDMA and TDMA systems, for example.

In remote terminals, such as cellular mobile telephones, there is currently provided a single power amplifier for transmission. This power amplifier has a wide radio frequency power operating range. Also, in CDMA-FDD systems, the power amplifier is operating continuously during the communications.

Moreover, the transmission power delivered by the power amplifier can vary within a predetermined range of powers, typically from −50 dBm to 24 dBm for third-generation mobile telephones. In this power range, the transmission power is adjusted as a function of power information received regularly by the telephone and originating from the base station.

At present, the power amplifier is designed in such a way as to exhibit the greatest effectiveness for the maximum transmission power. For intermediate or low power, there is significant deterioration in the effectiveness since the quiescent current of the power amplifier does not change, while the power transmitted decreases. Thus, in these modes of operation at low or intermediate power, the effectiveness, that is, the efficiency, drastically decreases to less than a percent. This results in a loss of energy at the level of the battery, thereby reducing its lifetime.

SUMMARY OF THE INVENTION

In view of the foregoing background, an object of the present invention is to monitor the transmission power of a remote terminal, in particular, of a cellular mobile telephone, to optimize its effectiveness without impairing the quality of the service transmitted and without causing signal distortion.

This and other objects, advantages and features according to the present invention are provided by a process for monitoring the transmission power of a remote terminal of a wireless communication system, for example, a cellular mobile telephone, in a predetermined power range or interval, in which transmission power is adjusted as a function of power information items (presets) received by the telephone.

According to a general characteristic of the invention, the telephone is equipped with variable-gain amplification means capable of covering the power range, and that a value of the gain and of the supply voltage of the amplification means are tuned as a function of the power information items.

The invention therefore makes it possible to adjust the gain of the amplification means as a function of the power demanded so as to minimize any thermal dissipation of power. Moreover, the person skilled in the art is aware that one of the parameters of an amplifier is the backoff with respect to its saturation point.

Modifying the gain of the amplifier and consequently modifying its output power entails modifying the backoff which may in certain cases become too small. This increases the risks of nonlinear operation of the amplifier, causing signal distortion. By also tuning the value of the supply voltage of the amplification means, optimum backoff is obtained.

Although the use, as means of amplification, of a single variable-gain power amplifier capable of covering the whole power range is conceivable, it is also possible to produce the variable-gain amplification means on the basis of at least two individually selectable power amplifiers capable together of covering the entire power range. Each amplifier respectively possesses two different specific zones of operation, and a common zone of operation. Also, the selection of one of these two amplifiers leads operationally to a variation in the gain of the amplifier stage.

One of the amplifiers is then advantageously associated with each point of the power range as a function of a predetermined allocation criteria. This allocation criteria is preferably an effectiveness criteria. Thus, it is possible to associate with each point of the power range the amplifier whose efficiency is highest for this point, for example. This can easily be applied, for example, to a GSM system in which the processing means of the telephone knows the power required by the base station at the instant of the temporal occurrence of the time interval allotted to the telephone.

Also, as a function of this power information item, one of the amplifiers may be selected just before the start of the time interval allotted to the telephone. As will be seen in greater detail below, an effectiveness criteria such as this may be modulated in the WCDMA systems, for example, so as to plan for the switching of the amplifiers with less disturbance with respect to the data transmission. This may then lead to associating certain points of the common zone with the amplifier which exhibits the greatest effectiveness, and to associating certain other points of the common zone with the amplifier which does not exhibit the greatest effectiveness.

In a particular mode of implementation applied to a GSM system, in the presence of a power information item received corresponding to a point of the common zone, a check is made so as to verify whether this power information item corresponds to the amplifier currently selected. If this is the case, use of the amplifier is continued for the delivery of the transmission power. In the contrary case, the power amplifier associated with the power information item is selected. In all cases, irrespective of which amplifier is selected, the value of the supply voltage of this amplifier is furthermore tuned as a function of the power information items.

By planning a common zone of operation for the two amplifiers, it is possible to make allowance for any inaccuracies in the values of the gains of the two amplifiers, so as in particular to avoid any hole in the power range. As a variation, at least one of the amplifiers may have variable gain. Also, apart from the selection of one of these amplifiers, the value of the gain of the selected amplifier is advantageously tuned as a function of the power information item.

In a CDMA system, and in particular a WCDMA system, the power amplifier is operating continuously during the communications since there is no concept of time sharing. Additionally, it is appropriate in this case, when also using two individually selectable power amplifiers capable of together covering the entire power span, to choose the instant of switching which will bring about minimum disturbance in the transmission.

This is why, in the presence of a power information item received corresponding to a point in the common zone, a check is made so as to verify whether this power information item corresponds to the amplifier currently selected. If this is the case, the use of this amplifier is continued for the delivery of the transmission power.

In the contrary case, a switching time span is defined, extending from the instant of reception of the power information item over a predetermined duration compatible with the limits of the common zone. The timing limits of an interruption time range lying in the switching range are also defined as a function of a predetermined criteria for interrupting transmission.

Adjustment of the transmission power with the amplifier currently selected is continued, possibly on the basis of new power information items received, until the occurrence of the interruption range. Then, if the last power information item received before the occurrence of the interruption range still does not correspond to the amplifier currently selected, the transmission is disabled during the interruption range. The power amplifier associated with the last power information item is selected, and transmission is reactivated with the new selected amplifier.

Stated otherwise, when the transmission power required by the base station reaches a limit with respect to the power amplifier currently selected, this power amplifier must be switched. However, since this power amplifier (which must be deselected) and the new power amplifier (which must be selected) possess a common zone of operation, the switching point can be chosen flexibly in a time span (switching range) corresponding to the limits of the common zone of operation. Also, within this switching range, the invention chooses the switching instant which will bring about minimum disturbance in the transmission.

Just as for the GSM systems, it is possible in the CDMA systems to plan for at least one of the amplifiers having variable gain. Also, apart from tuning the supply voltage as a function of the power information items, in addition a value of the gain of the selected amplifier will be tuned as a function of the power information item.

Generally, the information transmitted is formed of fragments or chips and is conveyed within successive frames each subdivided into a predetermined number of intervals or slots. The duration of the switching range is then advantageously on the order of a few intervals, such as four to eight intervals for example. Likewise, the duration of the interruption time range is advantageously on the order of a few fragments, such as two to four fragments for example.

According to a particular mode of implementation of the invention, the transmission interruption criteria comprises the choice of at least one predetermined particular event, which may occur in the course of a transmission and has a predetermined impact on the binary error rate (BER) in case of interruption of transmission during the occurrence of this particular event. The characteristics of the transmission are then analyzed in such a way as to detect the possible presence of this predetermined particular event within the switching range. If this presence is effective, the interruption time span is placed during the occurrence of this particular event.

Thus, interrupting the transmission is done so that switching of the amplifiers will have a desired predetermined impact on the transmission, which is a negligible impact. It is especially advantageous for the transmission interruption criteria to comprise the choice of a group of several predetermined particular events which may occur in the course of a transmission, and the ordering of these particular events according to a predetermined order of priority as a function of their respective impacts on the binary error rate. This is in case of an interruption of transmission during the occurrence of these particular events.

Thus, for example, the particular event having the highest priority will correspond to that for which the impact on the binary error rate is lowest if the interruption of the transmission takes place during the occurrence of this particular event. The particular event which will then be assigned the lowest priority will correspond to that whose impact on the binary error rate is highest, if the interruption of the transmission takes place in the course of this particular event.

The characteristics of the transmission are then advantageously analyzed by considering the order of priority in such a way as to detect the possible presence, during the switching span, of a predetermined particular event of the group.

Also, the interruption time span is placed during the occurrence of the first particular event thus detected in the order of priority.

Stated otherwise, if the presence of the particular event having the highest priority is detected, it is in the course of the occurrence of this event that the interruption range will be placed. Conversely, if a particular event assigned the highest priority is not detected, one will then seek to detect an event having a lower priority, and so on and so forth. Also, as soon as a particular event is detected, the interruption range is placed during the occurrence of this particular event.

Thus, when the information transmitted comprises data and monitoring indications, and is conveyed within successive frames each subdivided into a predetermined number of intervals, the monitoring indications comprises feedback information (FBI) and transport format combination indicators (TFCI). The group of particular events then includes, for example, in descending order of priority:

- of the empty intervals during a compressed mode of transmission (this particular event then being assigned the highest priority);
- of the intervals in the course of which the transmission has to be interrupted in a gated mode of transmission;
- of the parts of the silence intervals in a discontinuous mode of transmission, in the course of which neither feedback information (FBI) nor transport format combination indicators (TFCI) are transmitted;
- of the parts of the intervals in the course of which data having a high spreading factor, for example 128 or 256, are transmitted, but in the course of which neither feedback information (FBI) nor transport format combination indicators (TFCI) are transmitted;
- of the parts of the intervals in the course of which data having a low spreading factor, that is, less than or equal to 64, are transmitted, but without transmitting either feedback information (FBI) or transport format combination indicators (TFCI); and
- of the parts of the intervals in the course of which feedback information (FBI) or transport format combination indicators (TFCI) are transmitted.

This latter event is that which has the lowest priority and which consequently has the highest impact on the binary error rate. However, failing to find a particular event having a higher priority in the list just alluded to, one will nevertheless choose to switch the amplifier in the course of the transmission of the FBI or TFCI monitoring information, rather than risk losing the transmission.

The subject of the invention is also a remote terminal for a wireless communication system, for example, a cellular mobile telephone, comprising reception circuitry, transmission circuitry, a power amplification stage connected between the transmission circuitry and an antenna, and a processing stage able to adjust the output power of the amplification stage as a function of power information items received regularly by the reception circuitry.

According to a general characteristic of the invention, the power amplification stage comprises variable-gain amplification means capable of covering the power range. Also, the processing means are able to tune the value of the gain and of the supply voltage of the amplification means as a function of the power information items.

The new value of the gain will be dependent on the new value of output power, and it is possible to plan that the processing means furthermore comprises an array (memory) providing, for each value of the transmission power and of the gain, a value for the supply voltage of the amplification means.

Moreover, although it is possible to use a linear regulator for supplying the amplification means, it is especially advantageous to use a controllable, chopped supply making it possible to deliver and to tune the supply voltage on the basis of the battery voltage. The effectiveness is thus improved, the dissipation lower, and such a supply furthermore makes it possible to raise the supply voltage with respect to the battery voltage, when required by the output power preset.

As indicated above, one way of producing the variable-gain amplification means includes using at least two individually selectable power amplifiers capable of together covering the entire power span, respectively possessing different specific zones of operation and a common zone of operation. In this case, the power amplification stage furthermore comprises selection means able, in response to a selection information item, to link the output of the transmission circuitry to the input of the power amplifier corresponding to the selection information item.

Moreover, the processing stage comprises a correspondence table associating one of the amplifiers with each point of the power range, as a function of an allocation criteria, and monitoring means able, in the presence of a power information item received corresponding to a point of the common zone, to verify whether this power information item corresponds to the amplifier currently selected.

In an embodiment more especially adapted to GSM or GPRS telephones, the processing stage furthermore comprises control means able, if this power information item does not correspond to the amplifier currently selected, to deliver to the selection means the selection information item corresponding to the power amplifier associated with this power information item.

Moreover, the control means are also able to tune the value of the supply voltage of the selected amplifier. As a variation, at least one of the amplifiers may have variable gain, and the control means is able to furthermore tune the value of the gain of the selected amplifier as a function of the power information item.

In an embodiment more especially adapted to the CDMA system, and in particular the WCDMA system, the monitoring means are able, in the presence of a power information item received corresponding to a point of the common zone, to verify whether this power information item corresponds to the amplifier currently selected. In the contrary case, the monitoring means is able to define a switching time range extending from the instant of reception of the power information item over a predetermined duration compatible with the limits of the common zone, and to define as a function of a predetermined criteria for interrupting transmission, the timing limits of an interruption time span lying in the switching range.

Moreover, the control means are able to authorize the continuation, possibly on the basis of new power information items received, of the adjustment of the transmission power with the amplifier currently selected until the occurrence of the interruption range. Then, if the last power information item received before the occurrence of the interruption range still does not correspond to the amplifier currently selected, the transmission is disabled during the interruption range, to deliver to the selection means the selection information item corresponding to the power amplifier associated with the last power information item, and to reactivate the transmission with the new selected amplifier.

BRIEF DESCRIPTION OF THE DRAWINGS

Other advantages and characteristics of the invention will become apparent on examining the detailed description of modes of implementation and embodiments, which are in no way limiting, and the appended drawings, in which.

DETAILED DESCRIPTION OF THE PREFERRED EMBODIMENTS

Figure 1:
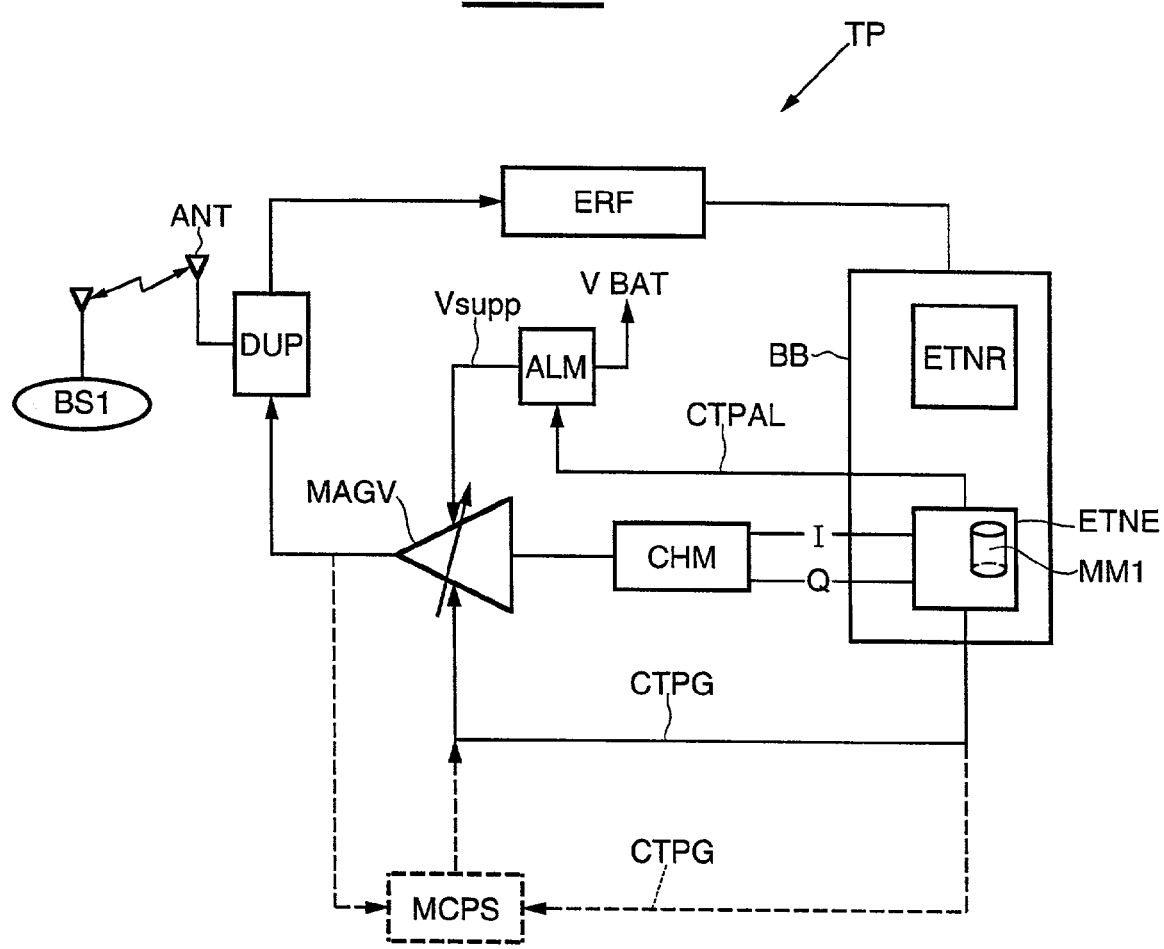
FIG. 1 is a block diagram illustrating a basic architecture of a cellular mobile telephone according to the present invention, and especially the transmission circuitry and the power amplifier stage.
Figure 3:
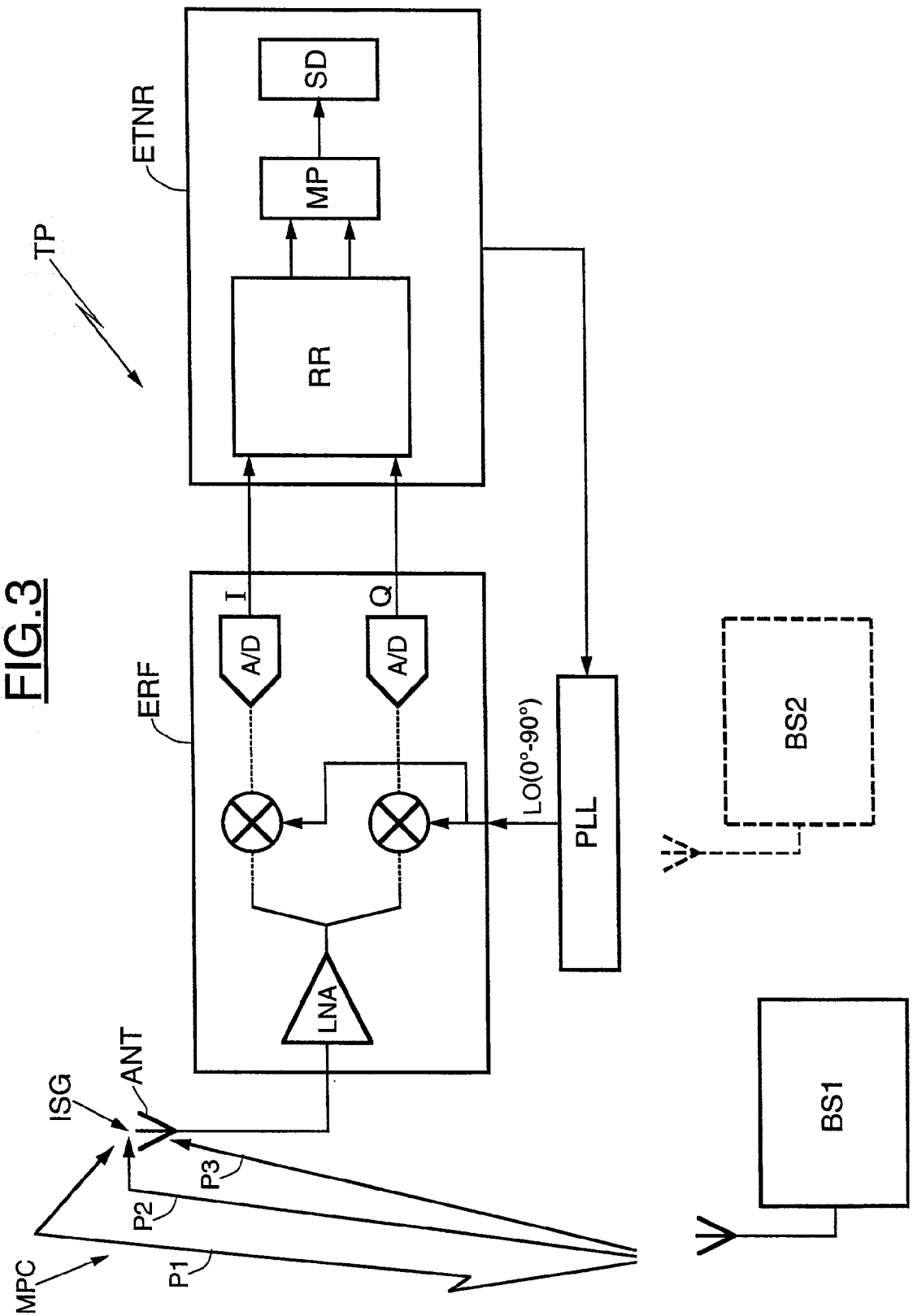
FIG. 3 is a block diagram illustrating, in particular, the reception part of a cellular mobile telephone according to the present invention.

In FIG. 1, the reference TP designates a remote terminal, such as a cellular mobile telephone, which is in communication with a base station BS1 according to a communication scheme of the CDMA-FDD type, for example. The cellular mobile telephone comprises, in a conventional manner, a radio frequency analog stage ERF connected to an antenna ANT by a duplexer DUP for receiving an input signal ISG (FIG. 3).

Figure 2:
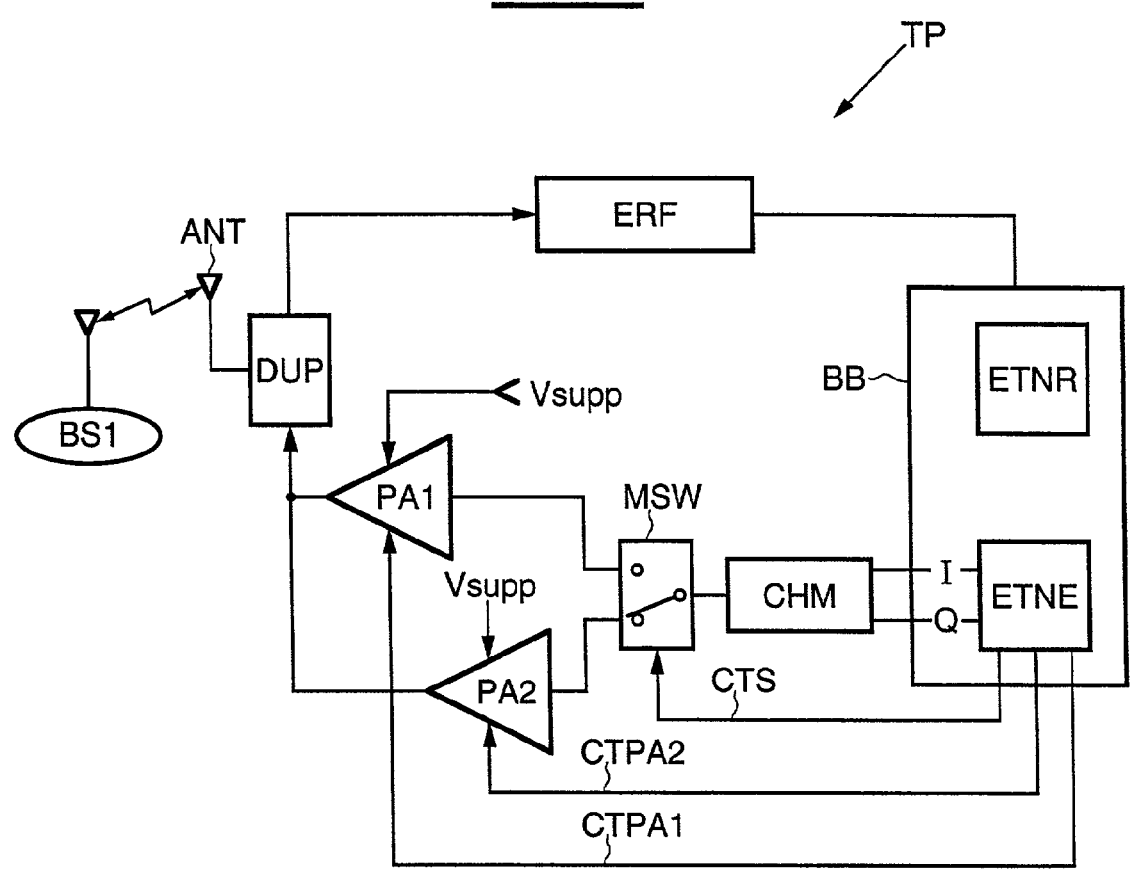
FIG. 2 is a block diagram illustrating an embodiment of a cellular mobile telephone according to the present invention, in which the variable-gain amplification means is formed by two selectable amplifiers.

Conventionally, the stage ERF comprises (FIG. 3) a low noise amplifier LNA and two processing pathways including mixers, filters and conventional amplifiers (not represented in FIG. 2 for the sake of simplification). The two mixers respectively receive from a phase-locked loop PLL two signals exhibiting a 90° mutual phase difference. After frequency transposition in the mixers, the two processing pathways respectively define two streams I (direct stream) and Q (quadrature stream) according to terminology well known to those skilled in the art.

After digital conversion in analog/digital converters, the two streams I and Q are delivered to a reception processing stage ETNR. This processing stage ETNR comprises, in a conventional manner, a receiver RR, commonly designated by the person skilled in the art as a Rake receiver, followed by conventional means of demodulation MP which perform the demodulation of the signals delivered by the Rake receiver RR.

Due to the possible reflections of the signal initially transmitted, such as off obstacles lying between the base station and the mobile telephone, the transmission medium is a multipath transmission medium MPC, that is, one which comprises several different transmission routes (three transmission routes P1, P2, P3 are represented in FIG. 2). Consequently, the signal ISG which is received by the mobile telephone comprises various time delayed versions of the signal initially transmitted. These versions are the result of the multipath transmission characteristics of the transmission medium. Also, each path introduces a different delay.

The Rake receiver RR, with which a cellular mobile telephone operating in a CDMA communication system is equipped, is used to perform the timing alignment, the descrambling, the despreading and the combining of the delayed versions of the initial signals, so as to deliver the information contained in the initial signals. Of course, the signal received ISG could also result from the transmission of initial signals respectively transmitted by various base stations BS1 and BS2.

The processing stage ETNR also comprises in a conventional manner a source decoder SD which performs a source decoding well known to the person skilled in the art. As is also well known to the person skilled in the art, the phase-locked loop PLL is controlled by an automatic frequency-control algorithm incorporated into a processor of the stage ETNR.

Before transmission via the antenna of the base station BS1, the initial signal containing the information (symbols) is scrambled and spread by processing means of the base station, by using the scrambling code of the base station and the orthogonal code (OVSF) of the telephone TP. Consequently, the symbols are transformed into fragments (known as chips) having a predetermined length (for example, equal to 260 ns), and corresponding to a predetermined fragment rate (or chip rate) equal, for example, to 3.84 Mcps. Thus, the fragment rate (chip rate) is larger than the symbol rate. Thus, a symbol can be transformed into a number of fragments ranging from 4 to 256.

Figure 6:
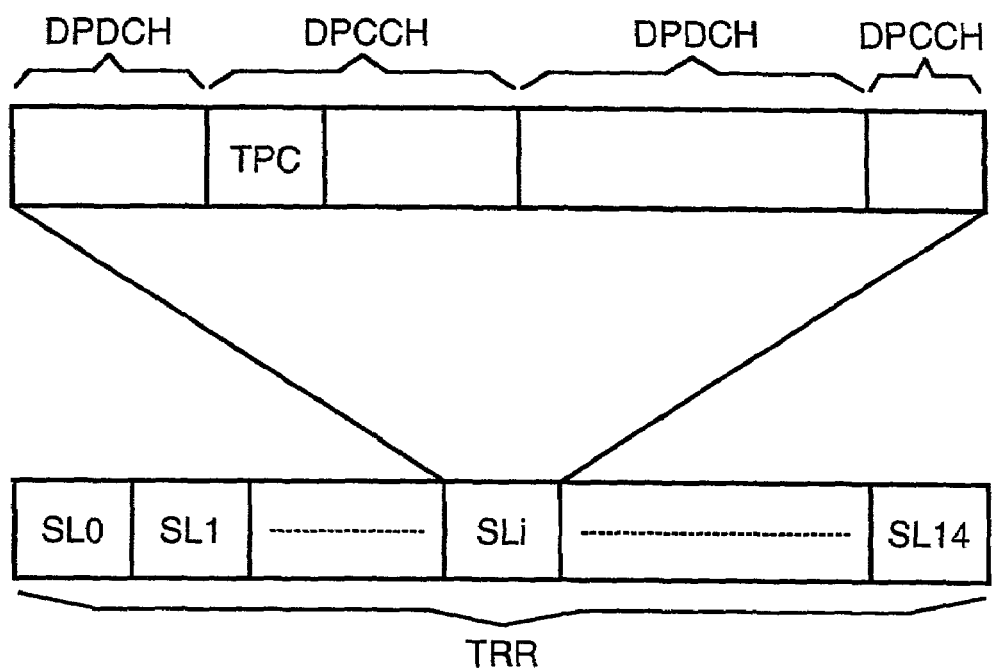
FIG. 6 illustrates a reception time frame structure transmitted by a base station intended for a cellular mobile telephone according to the present invention.

As illustrated in FIG. 6, the information transmitted by the base station and formed of fragments is conveyed within successive frames TRR, with each frame subdivided into a predetermined number of intervals or slots SLi. Each frame TRR, having a length of 10 ms, is subdivided into fifteen intervals SL0–SL14, with each interval having a length equal to 2560 fragments.

The information received by the telephone and emanating from the base station comprises data conveyed on a data channel DPDCH, and monitoring indications conveyed on a monitoring channel DPCCH. In the down direction (known as the downlink), each time interval SLi of the frame TRR contains in a nested manner (FIG. 6) data and monitoring indications. This is known to the person skilled in the art. Nonetheless, one may refer to the 3G TS 25.211 technical specification for further details. This specification is published by the 3GPP body, 650 Route des Lucioles—Sophia Antipolis-Valbonne-France, and is titled "3rd Generation Partnership Project; Technical Specification Group Radio Access Network; Physical channels and mapping of transport channels onto physical channels (FDD)", (1999).

Among these monitoring indications there is a transmit power control (TPC) word which in fact forms a power information item required by the network and allows the mobile telephone TP to adjust the transmission power of the power amplifier stage, so as to comply with this power information item, as will now be described in greater detail.

In this regard, referring again more especially to FIG. 1, it may be seen that the baseband processing block BB comprises, in addition to the processing stage ETNR, a transmission processing stage ETNE which performs, in a conventional manner, the processing operations of source coding, spreading of the symbols and modulation so as to deliver the two streams I and Q to transmission circuitry CHM. The transmission circuitry is also of conventional structure.

This transmission circuitry CHM comprises at the front end digital/analog converters, as well as mixers making it possible to perform a frequency transposition to the transmission frequency. Here again, the transposition signals are delivered by a phase-locked loop (not represented here for the sake of simplification) also monitored by automatic frequency monitoring means incorporated in the stage ETNE.

The power amplification stage of the mobile telephone TP comprises a variable-gain amplification means MAGV whose input is linked to the output of the transmission circuitry CHM. The output of the amplification means MAGV is linked to the antenna AMT by way of a duplexer DUP.

The amplification means MAGV is supplied from a supply ALM, preferably a chopped supply, which delivers in response to a control signal CTPAL delivered by the means ETNE, the supply voltage Vsupp for the amplification means MAGV. This is done on the basis of the battery voltage of the telephone VBAT. Moreover, the processing means ETNE deliver a gain control signal CTPG making it possible to tune the value of the gain of the amplification means.

The principle of operation of the power amplification stage according to the invention is then as follows. In tempo with the receiving of the power information items TPC, the stage ETNE delivers the signal CTPG so as to adjust the value of the gain as a function of the new transmission power required. Moreover, the stage ETNE comprises a memory MM1 storing a table which, for each value of the transmission power required and of the gain, provides a value of the supply voltage Vsupp. Consequently, the stage ETNE delivers the control signal CTPAL to the chopped supply ALM in such a way that the latter delivers this voltage Vsupp with regards to the voltage of the battery. This is done to minimize the backoff of the amplification means.

An embodiment of the invention in which the variable-gain amplification means MAGV is obtained via two individually selectable fixed-gain power amplifiers PA1 and PA2 will now be described while referring to FIGS. 2 and 4 to 11. Each power amplifier is represented in FIG. 2 by a single triangle. Of course, the person skilled in the art is aware that a power amplifier is actually made up of a preamplifier and a power stage.

The power amplification stage of the mobile telephone TP comprises two power amplifiers PA1 and PA2, of conventional structure, whose respective inputs are linked to the outputs of selection means MSW. The selection means is formed of a duplexer monitored by a selection signal CTS formulated and delivered by the processing stage ETNE. The input of the duplexer MSW is linked to the output of the transmission circuitry CHM. The respective outputs of the two amplifiers PA1 and PA2 are linked to the antenna ANT by way of the duplexer DUP. Each amplifier PA1, PA2 is controlled by a control signal CTPA1, CTPA2 making it possible to disable operation thereof. These two signals CTPA1 and CTPA2 are also delivered by the processing stage ETNE.

Figure 4:
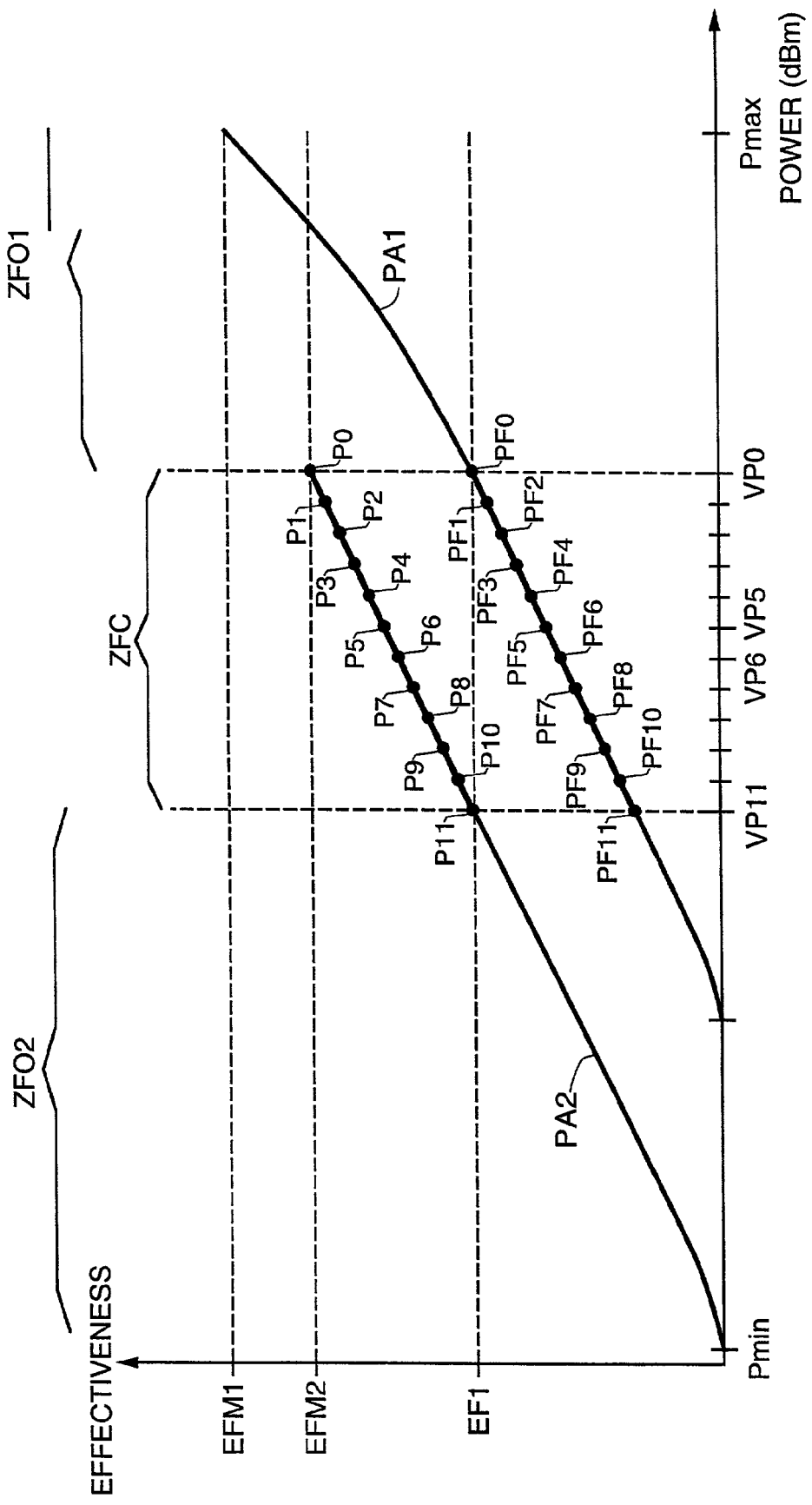
FIG. 4 illustrates two effectiveness curves associated with two power amplifiers for the power amplification stage of a mobile telephone according to the present invention.

As illustrated in FIG. 4, each power amplifier has a specific zone of operation and a common zone of operation shared with the other power amplifier. Thus, by way of example, the amplifier PA1 has a specific zone of operation ZFO1, for which the effectiveness (efficiency) of the amplifier increases from a value EF1 to a value EFM1 in a power zone lying between VP0 dBm and Pmax for example. For powers below VP0 dBm, the effectiveness of the amplifier PA1 decreases from the value EF1.

Likewise, the specific zone of operation ZFO1 of the amplifier PA2 extends from Pmin to VP11 dBm. The effectiveness of the amplifier PA2 continues to increase subsequently, reaching the value EFM2 at VP0 dBm. The two power amplifiers therefore together cover the entire power range, from Pmin to Pmax. The two power amplifiers have different fixed gains.

Moreover, the two power amplifiers possess a common zone of operation ZFC whose limits have been fixed here at VP11 dBm and VP0 dBm. The limits of this common zone of operation have been defined in such a way that the amplifier which exhibits less effectiveness in this zone nevertheless has acceptable effectiveness.

Each point in the range of power is associated with one of the amplifiers as a function of an allocation criteria which takes into account the effectiveness in combination with the need to switch amplifiers under conditions suitable for data transmission. Thus, all the operating points lying between Pmin and VP11 dBm are associated with the amplifier PA2. Likewise, all the operating points lying between VP0 dBm and Pmax are associated with the amplifier PA1.

In the example described for the entire common zone, it is the amplifier PA2 which exhibits the best effectiveness. However, if the power required continues to increase, it will then be appropriate to switch over to the amplifier PA1. This is the reason why, in this common zone, an operating point is defined beyond which it will be appropriate to take the decision to switch. This point is, for example, the point P6 corresponding to the power value VP6.

Figure 5:
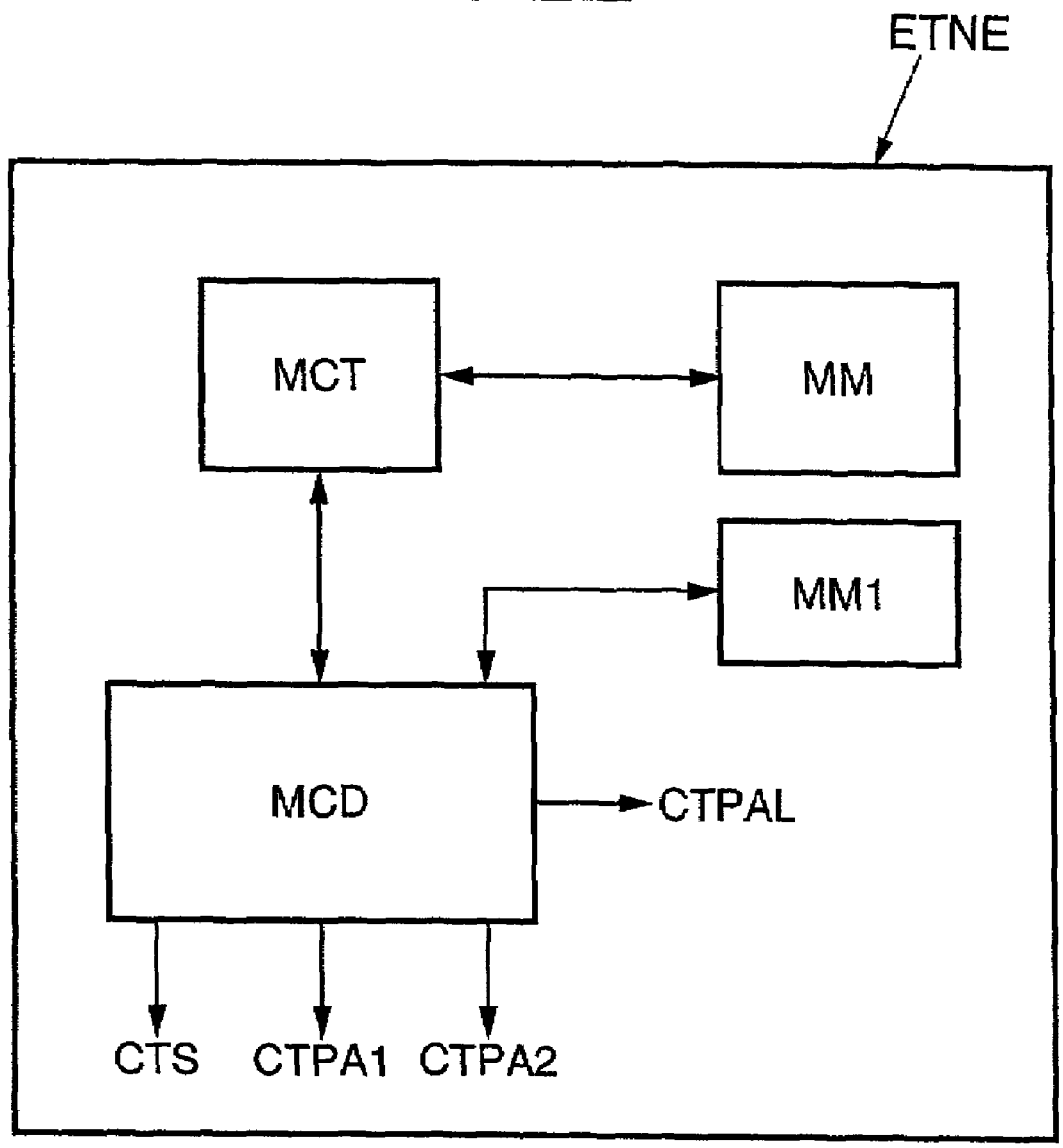
FIG. 5 is a more detailed block diagram diagrammatically illustrating the internal structure of a transmission digital processing stage of a cellular mobile telephone according to the present invention.

Thus, in the common zone of operation, all the operating points lying between VP11 dBm and VP6 dBm are associated with the amplifier PA2. Conversely, all the operating points lying between VP5 dBm and Pmax are associated with the amplifier PA1. This table of correspondence between an operating point and a power amplifier is stored in a memory MM of the stage ETNE (FIG. 5). In addition to the means which have already been alluded to above, the stage ETNE moreover comprises monitoring means MCT and control means MCD. These means may be embodied in software within a microprocessor for example.

The power information items TPC (FIG. 6) are received within each time interval SLi, and the variation in power between two successive power information items is, for example, 1 dBm. As long as the power information item TPC received by the processing stage ETNE lies in the specific zone of operation of the amplifier PA1 (it being assumed here that the latter is selected) and outside of the common zone of operation ZFC, there is no need to change power amplifiers. The transmission power can continue to be adjusted with the information items TPC using the selected amplifier PA1.

When the power demanded by the network decreases and corresponds to an operating point lying in the common zone of operation ZFC, the monitoring means will, in a general manner, verify whether this power information item TPCi received (step 90, FIG. 10) corresponds to the amplifier currently selected (step 91), that is, to the amplifier PA1. If this is the case, there is no modification of selection of the power amplifier. Such is the case for the operating points PF0 to PF5, for example.

Conversely, if a power information item TPCi received in step 90 (FIG. 10) corresponds to the operating point PF6, it is then appropriate to switch the power amplifier and to select the amplifier PA2. In this regard, the monitoring means MCT will then define a switching time span PCM (step 92) extending from the instant of reception of the power information item TPCi (corresponding to the operating point PF6), over a predetermined duration compatible with the limits of the common zone ZFC.

The monitoring means MCT will also define, as a function of a predetermined criteria for interrupting transmission CRF, the content of which will be returned to in greater detail below, the timing limits of an interruption time range PIT lying in the switching range PCM. Stated otherwise, the monitoring means will define, on the basis of the point PF5, a switching range inside which it will be possible to change power amplifiers while continuing, before this switching point, to adjust the transmission power using the amplifier currently selected, that is, the amplifier PA1. This is done although the latter exhibits a lesser effectiveness than that of the amplifier PA2. The limit of the switching range will, for example, be that defined by the point PF10. Specifically, the points PF6 and PF10, wherein the effectiveness of the amplifier PA1 remains acceptable, whereas beyond the point PF10 it is deemed to be too low. In terms of intervals or slots, the duration of the switching span corresponds to four intervals.

Of course, the person skilled in the art will be able to adjust the length of the switching range as a function of the various curves of effectiveness of the amplifiers in the common zone of operation. In a general manner, it will be possible to choose a switching range of between about four to eight intervals.

If it is now assumed that it is the amplifier PA2 which is selected, and that the power demanded by the network increases and corresponds to an operating point lying in the common zone of operation ZFC. The monitoring means will verify whether this power information item TPCI received (step 90, FIG. 10) corresponds to the amplifier currently selected (step 91), that is, to the amplifier PA2. If this is the case, there is no modification of selection of the power amplifier. Such is the case, for example, for the operating points P11 to P6.

Conversely, if a power information item TPCi received in step 90 (FIG. 10) corresponds to the operating point P5, it is then appropriate to switch the power amplifier and to select the amplifier PA1. In this regard, the monitoring means MCT will define the switching time span PCM (step 92) extending from the instant of reception of the power information item TPCI (corresponding to the operating point P5), over a predetermined duration compatible with the limits of the common zone ZFC.

The monitoring means MCT will also define, as a function of the predetermined criteria for interrupting transmission CRF, the timing limits of the interruption time range PIT lying in the switching range PCM. Stated otherwise, the monitoring means will define, on the basis of the point PF5, a switching range inside which it will be possible to change power amplifiers while continuing, before this switching point, to adjust the transmission power using the amplifier currently selected, that is, to the amplifier PA2. The limit of the switching span will, for example, be that defined by the point P1.

Once this switching range PCM has been delimited, the monitoring means will define, as a function of the transmission interruption criteria, the interruption time range PIT which will correspond to the best moments to change amplifiers. This change necessitates the prior stopping of the transmission of the telephone.

Figure 10:
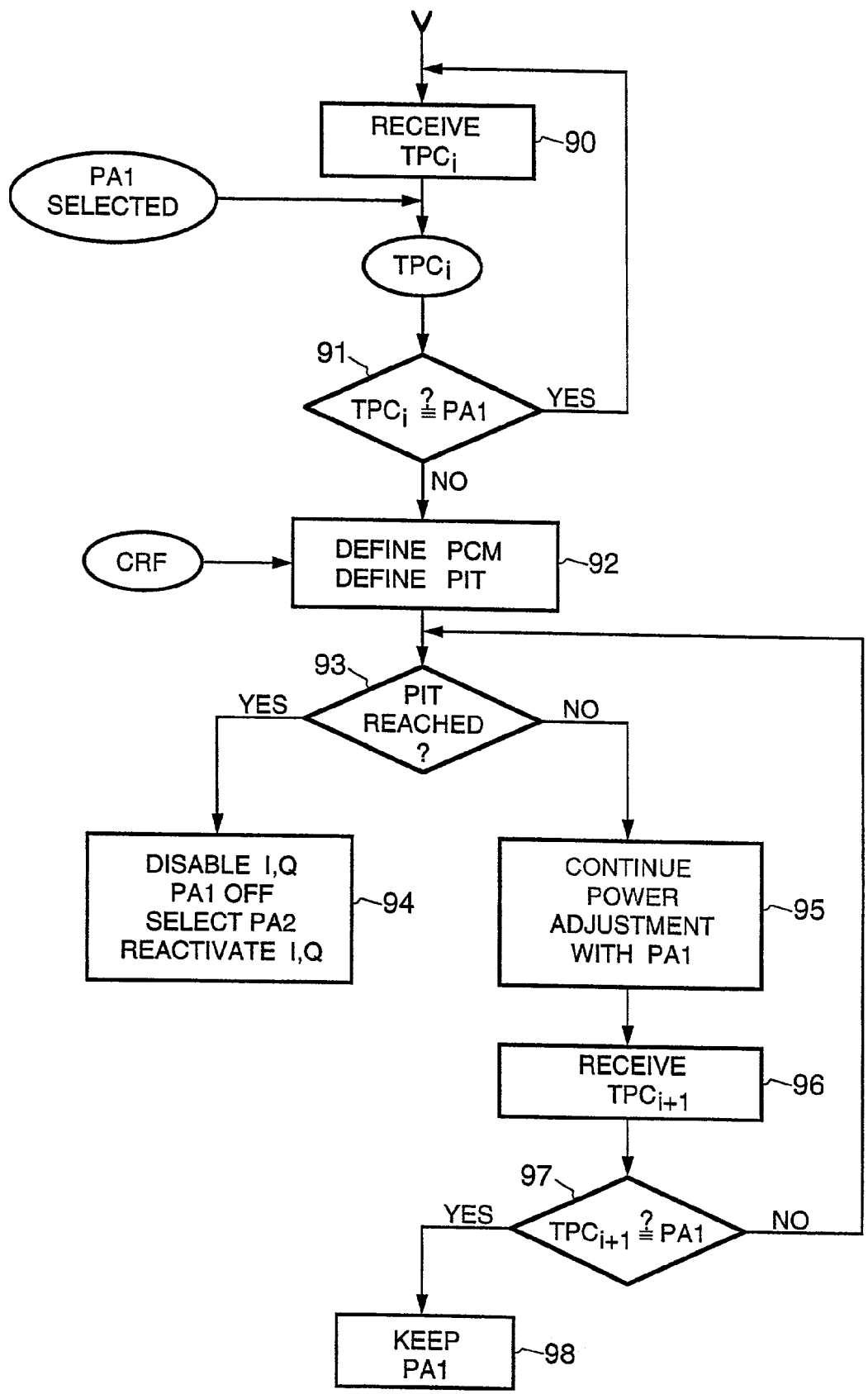
FIG. 10 is a flowchart of a mode of implementation of the process according to the present invention, for allowing the switching at a chosen instant of a power amplifier.

Reference will now be made more particularly to FIG. 10 to continue with the switching algorithm. It is again assumed that the amplifier PA1 was initially selected. The control means will detect in step 93 the occurrence of the interruption range PIT. As long as this interruption range has not been reached, the monitoring means will authorize the continuation (step 95) of the adjusting of the transmission power with the amplifier currently selected, that is, to the amplifier PA1. This may be done on the basis of new power information items TPC received. Thus if, by way of example, the interruption time range PIT must occur at an instant corresponding to an operating point lying between the points PF7 and PF8, the transmission power will continue to be adjusted until the occurrence of this interruption range PIT using the information TPC corresponding to the points PF6 and PF7 (steps 96 and 97).

With each reception of a new power information item TPCi+1, the control means verify whether the new power information item received corresponds to the amplifier currently selected, that is, to the amplifier PA1 (step 97). If this was the case (for example, if the power information item received immediately after that associated with point PF6 corresponds to the operating point PF5), there is no longer any grounds for changing power amplifiers and the power amplifier currently selected PA1 is kept (step 98).

Figure 11:
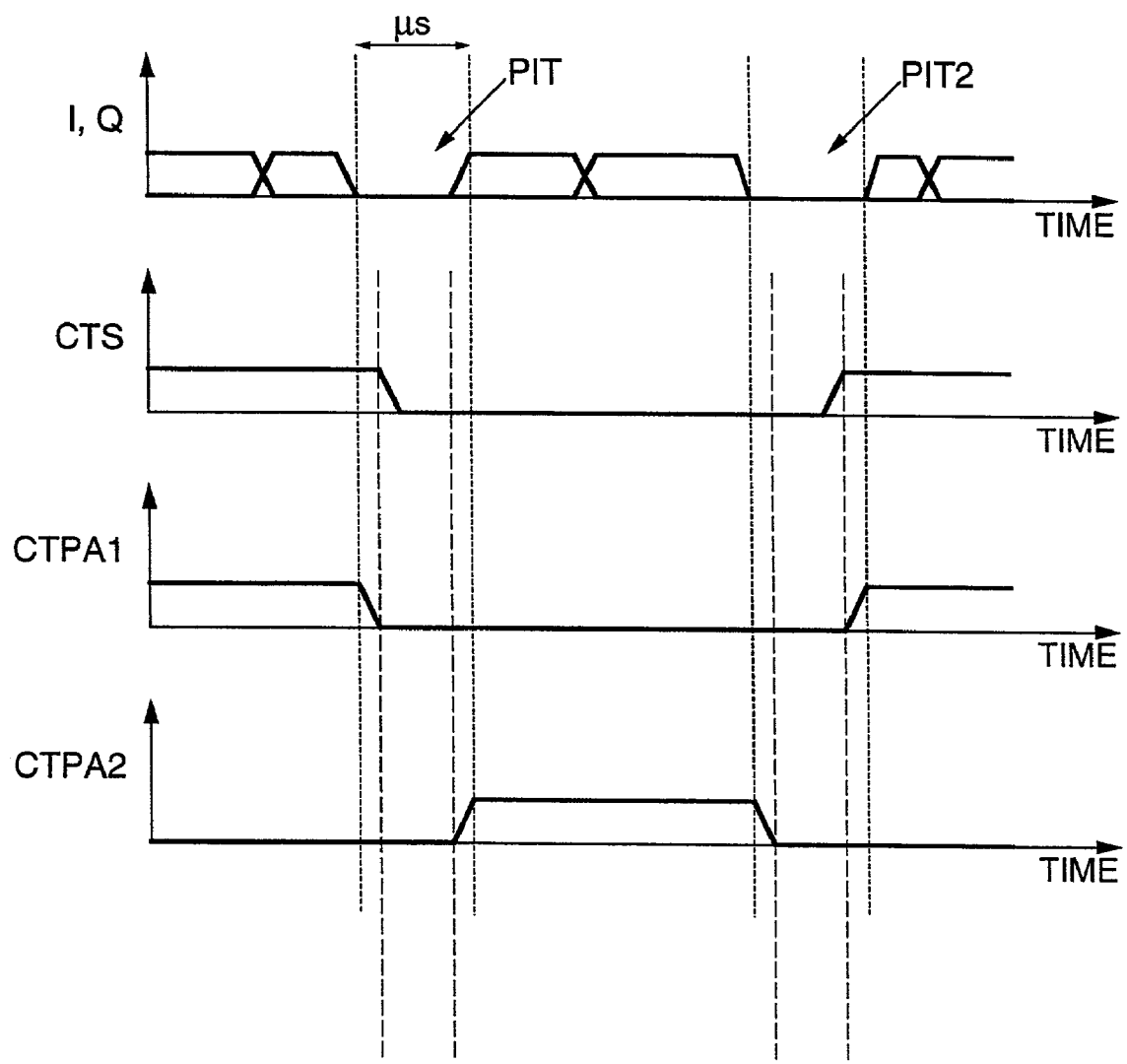
FIG. 11 is a timing chart corresponding to a mode of implementation of the process according to the present invention.

When the control means detect the occurrence of the interruption time span, they then initiate the switching scheme (step 94) illustrated in FIG. 11. In a general manner, as illustrated in this FIG. 11, the control means will disable the transmission (I, Q) throughout the duration of the interruption range PIT. Then, they will deliver to the selection means MSW the selection information item CTS corresponding to the power amplifier associated with the last power information item received, and then they will reactivate the transmission with the new selected amplifier.

Although various modes of switching may be planned for switching the two power amplifiers, the one described with reference to FIG. 11 makes it possible to minimize the disturbances and prevent in particular the two amplifiers both being operational for a short instant. Thus, the control signal CTPA1 of the amplifier PA1 is first set to 0 (amplifier PA1 deactivated) once transmission has been disabled. Then, the selection signal CTS is delivered to the selection means MSW, which then link the output of the transmission circuitry CHM to the input of the amplifier PA2.

Then, the control signal CTPA2 is set to 1, thus activating the operation of the amplifier PA2. When this amplifier PA2 is activated, the control means reactivate the transmission I, Q. This time chart may possibly be reproduced subsequently in the course of another interruption time range PIT2 in the case where it would be appropriate to switch back to the amplifier PA1.

The duration of the interruption time span PIT is also chosen in such a way as to minimize the risks of disturbances of the transmission while permitting effective and crisp switching of the amplifiers. By way of example, it will be possible to choose a duration on the order of a few fragments or chips, for example two to four fragments. This corresponds to a duration of up to about a microsecond.

We shall now return in greater detail to the formulation of the predetermined criteria for interrupting transmission CRF. In a general manner, the transmission interruption criteria CRF comprises the choice of at least one predetermined particular event which may occur in the course of a transmission, and has a predetermined impact on the binary error rate should transmission be interrupted during the occurrence of this particular event. A particular event which minimizes the binary error rate should transmission be interrupted during the occurrence of this particular event will thus preferably be chosen. Thus, if this particular event is detected within the switching span PCM, the monitoring means then place the interruption time range PIT during the occurrence of this particular event.

According to one mode of implementation of the invention, the transmission interruption criteria advantageously comprises the choice of a group of several predetermined particular events which may occur in the course of a transmission, and the ordering of these particular events according to a predetermined order of priority as a function of their respective impacts on the binary error rate in case of interruption of transmission during the occurrence of these particular events. Thus, the particular event having the highest priority will lead to the lowest binary error rate should transmission be interrupted during the occurrence of this particular event of highest priority. The particular event having the least priority will lead to a higher binary error rate.

The monitoring means will then analyze the characteristics of the transmission by considering the order of priority, in such a way as to detect any possible presence during the switching range PCM of a predetermined particular event of the group. Also, the monitoring means will then place the interruption time range PIT during the occurrence of the first particular event thus detected in the order of priority.

Figure 7:
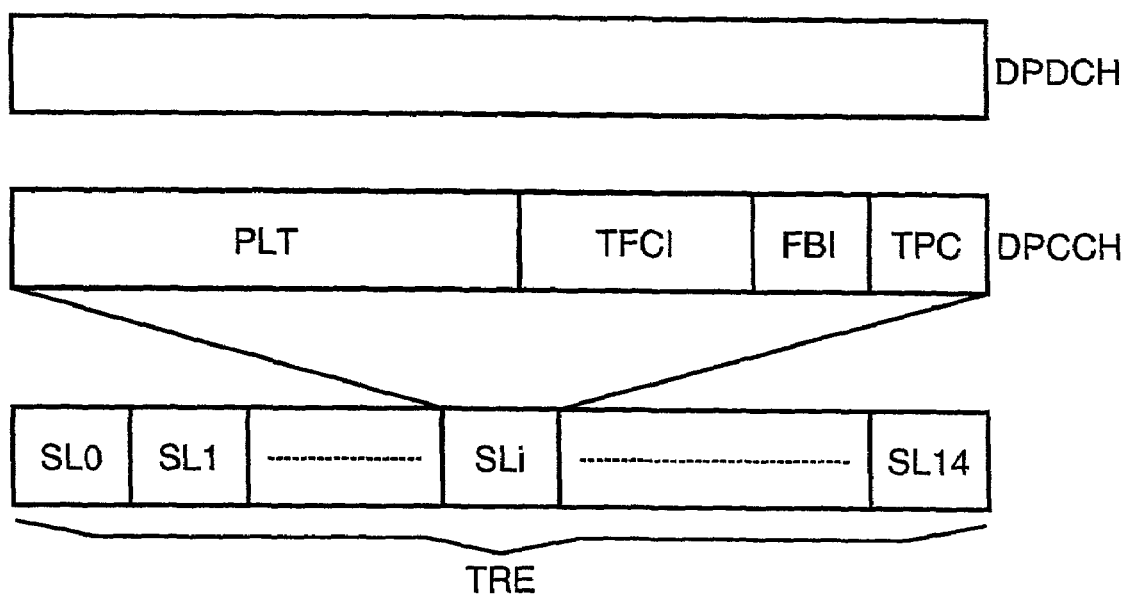
FIG. 7 illustrate a transmission frame transmitted by a cellular mobile telephone intended for a base station in a normal mode of transmission according to the present invention.
Figure 8:
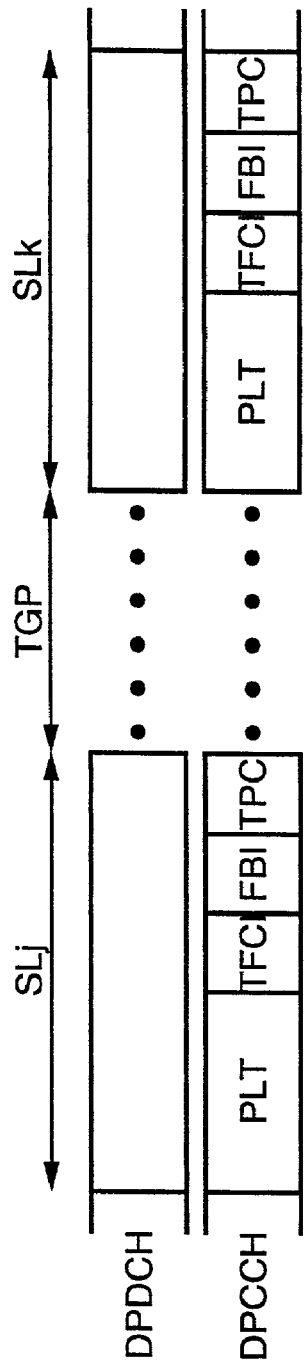
FIG. 8 partially illustrates a structure of a transmission frame in a compressed mode of transmission.
Figure 9:
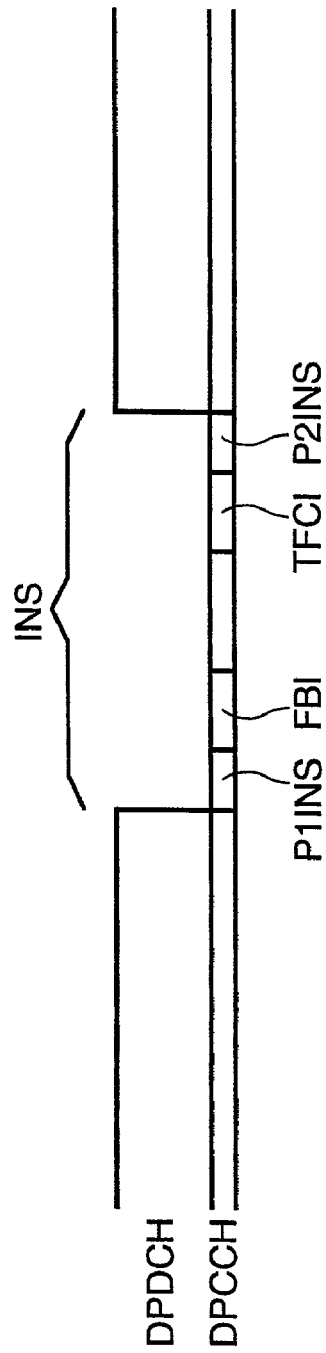
FIG. 9 partially illustrates a structure of a transmission frame in a discontinuous mode of transmission according to the present invention.

Reference will now be made to FIGS. 6 to 8 to illustrate the particular events making it possible to define the interruption time range PIT. FIG. 6 diagrammatically illustrates a transmission frame TRE within which are transmitted the information items emanating from the telephone intended for the base station (uplink direction) in a normal mode of operation.

More precisely, in a manner similar to the reception frame TRR (FIG. 5), the transmission frame TRE is also subdivided into fifteen intervals SLi. Within each interval SLi are conveyed in parallel the data channel DPDCH and the monitoring channel DPCCH. More precisely, the monitoring indications conveyed comprise a word PLT relating to a pilot signal, a word TFCI corresponding to a transport format combination indicator, a word FBI corresponding to a feedback information item and a word TPC corresponding to a transmitted power information item. A person skilled in the art will also be able to refer to the 3G TS 25.211 specification mentioned above for further details relating to the structure of a transmission frame TRE.

Moreover, the data contained in the data channel DPDCH may be spread with a variable spreading factor. This spreading factor may thus vary from 4 to 256 depending on the quality of service required. In addition to the normal mode of transmission, the information transmitted may be within a so-called compressed mode of transmission. In a compressed mode of transmission such as this, there are provided, as illustrated in FIG. 7, empty intervals TGP separating transmission intervals SLj and SLk and in the course of which no information is transmitted. For further details regarding the compressed mode of transmission, the person skilled in the art may refer to the 3G TS 25.212 technical specification derived from the same reference (3 GPP) as mentioned previously.

In addition to the compressed mode of transmission, the portable telephone may also, under certain circumstances, talk to the base station in a so-called gated mode of transmission. In this gated mode of transmission, the transmission must be interrupted in the course of certain intervals of each frame. The number of intervals in the course of which the transmission must be interrupted, as well as their position in the frame, depend on the gating rate. A gated transmission mode such as this is also known to the person skilled in the art. For further details, reference is directed to the 3G TR 25.840 specification derived from the reference mentioned previously (3GPP).

The portable telephone may also talk to the base station in a discontinuous mode of transmission (known as the DTX mode). Such a mode of transmission is also well known to the person skilled in the art. It is characterized in particular, as illustrated in FIG. 8, by silence intervals INS in the course of which no data is transmitted on the data channel DPDCH towards the base station. Conversely, the monitoring channel DPCCH continues to be transmitted and can comprise in particular the words FBI and TFCI.

The group of particular events then includes, in descending order of priority: of the empty intervals TPG during a compressed mode of transmission; of the intervals in the course of which the transmission may be interrupted in a gated mode of transmission; of the parts P1INS or P2INS (FIG. 8) of the silence intervals INS in a discontinuous mode of transmission, in the course of which neither feedback information FBI nor transport format combination indicators TFCI are transmitted; of the parts of the intervals in the course of which data having a high spreading factor (for example 128 or 256) are transmitted without transmitting either feedback information FBI or transort format combination indicators TFCI; of the parts of the intervals in the course of which data having a low spreading factor are transmitted without transmitting either feedback information FBI or transport format combination indicators TFCI; and of the parts of the intervals in the course of which feedback information FBI or transport format combination indicators TFCI are transmitted.

Stated otherwise, the monitoring means will first detect whether the switching range PCM will contain at least one empty interval TGP in compressed transmission mode. If this is the case, the monitoring means will place the transmission interruption range PIT in this empty interval.

If this is not the case, the monitoring means will detect the possible presence of a gated mode of transmission and will then place the transmission interruption range PIT in one of the intervals in the course of which transmission may be interrupted. If this is not the case, the monitoring means will detect the possible presence of a discontinuous mode of transmission and will then place the transmission interruption range PIT in sections P1INS or P2INS (FIG. 8).

If this is not possible, the monitoring means will then detect the possible presence of sections of intervals in the course of which data are transmitted with a high spreading factor, but in which neither feedback information FBI nor transport format combination indicators TFCI are transmitted. If this detection is positive, the monitoring means will place the transmission interruption range these sections of intervals.

If the detection is negative, the monitoring means will attempt to detect sections of intervals in which data having a low spreading factor are transmitted, but there is still no transmission of any feedback information FBI or transport format combination indicators TFCI. The monitoring means will then place the transmission interruption range PIT in these sections of intervals.

Also, if none of the prior detections were positive, the monitoring means will then place the transmission interruption range PIT in the sections of the intervals in the course of which feedback information FBI or transport format combination indicators TFCI are transmitted. Of course, everything described above with respect to the two amplifiers applies if more than two amplifiers are used provided that they exhibit operating zones which overlap at least pairwise.

Referring now again more especially to FIGS. 2 and 5, regardless of which amplifier has been selected, the means of control MCD of the stage ETNE will, on the basis of the content of the memory MM1, deliver to the chopped supply ALM the signal CTPAL in such a way as to tune the supply voltage Vsupp of the selected amplifier.

Figure 12:
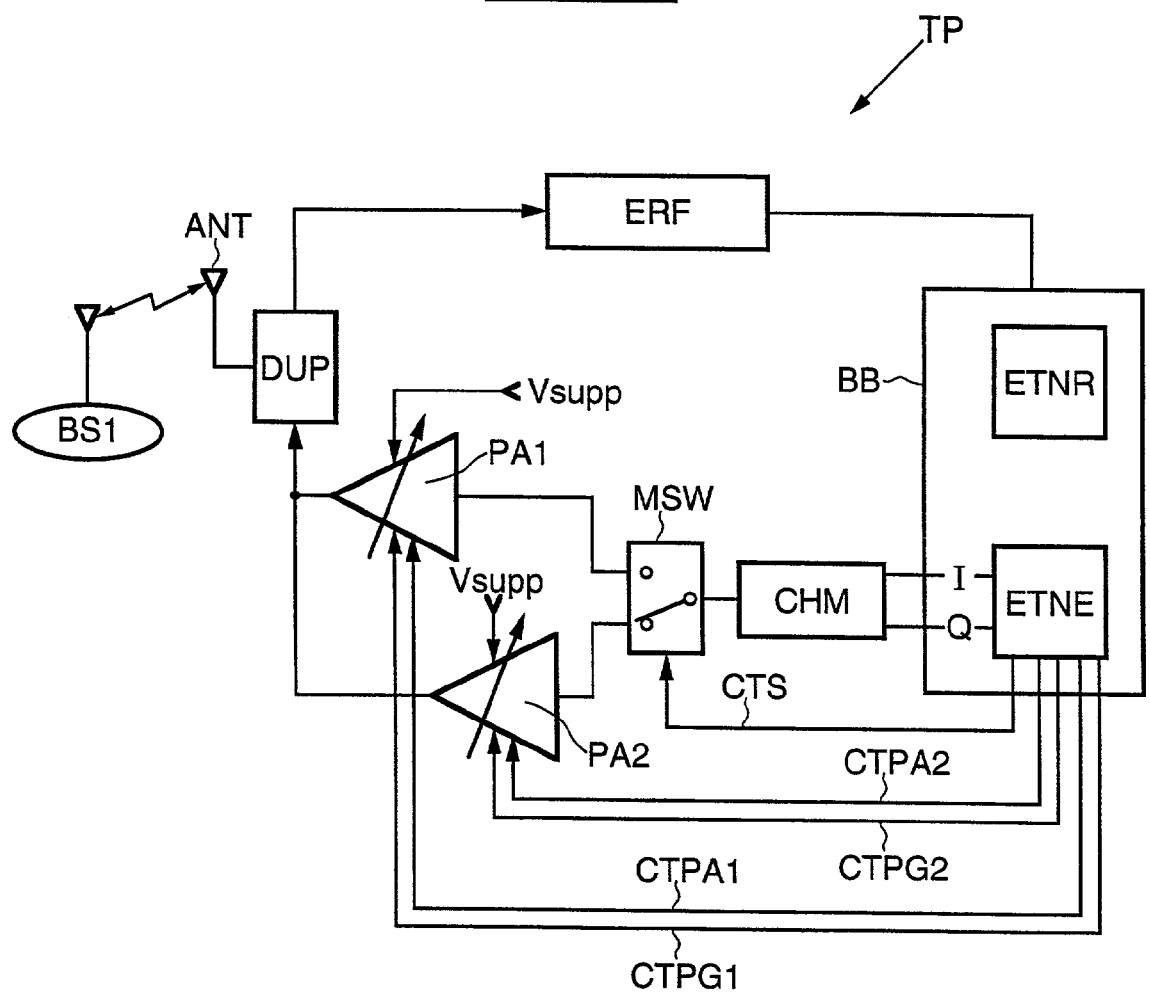
FIGS. 12 and 13 illustrate another embodiment of a telephone according to the present invention in which the two selectable amplifiers have variable gain.
Figure 13:
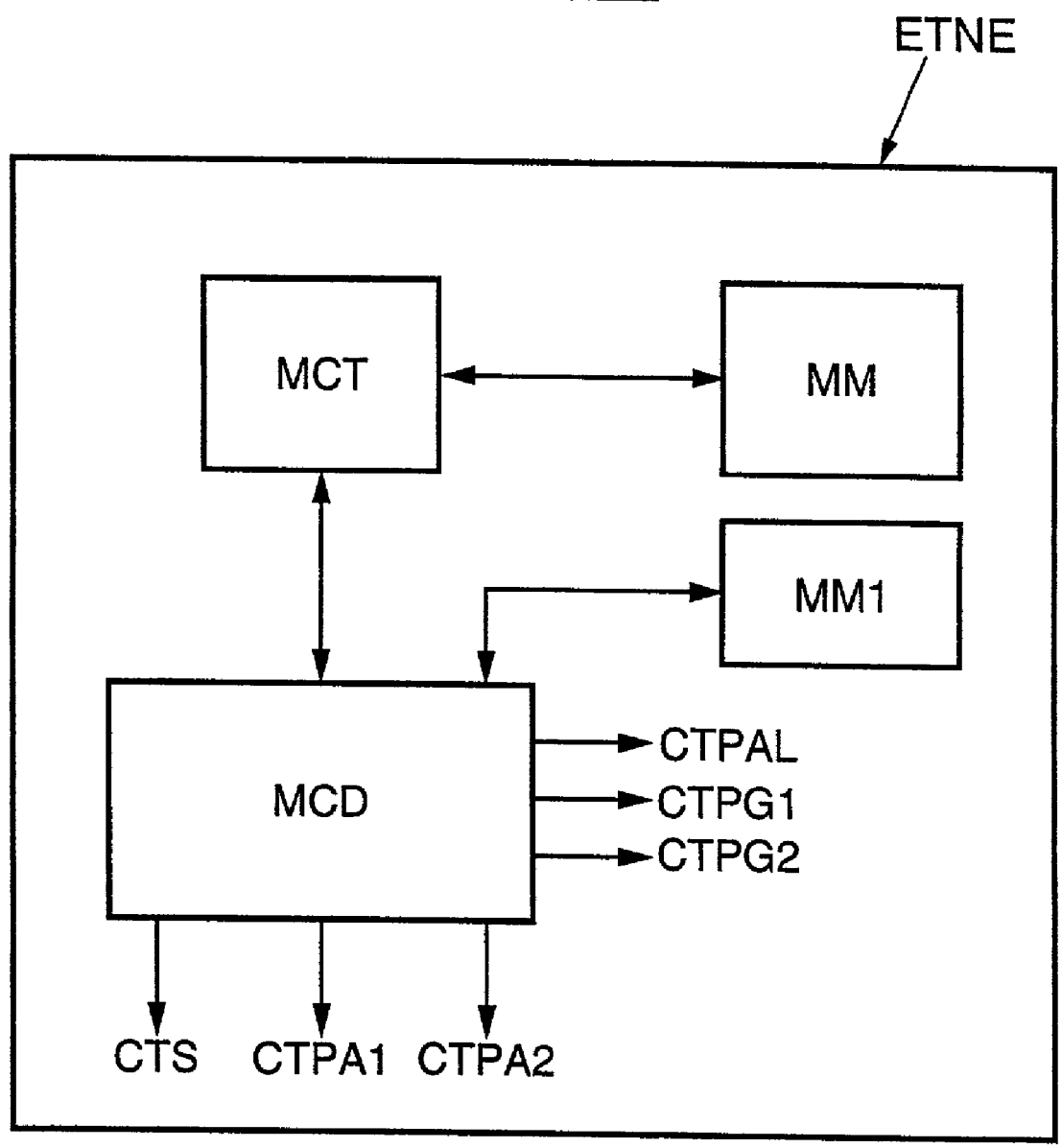

In the embodiment illustrated in FIGS. 12 and 13, the two amplifiers PA1 and PA2 this time have variable gain. The principle of selection and switching of these two amplifiers is identical to that just described with reference to the previous figures. In this embodiment, the control means MCD furthermore deliver to the selected amplifier the gain control signal CTPG1 (for the amplifier PA1) or CTPG2 (for the amplifier PA2).

Of course, in addition to the gain control signal delivered to the selected amplifier, the control means MCLD still deliver to the chopped supply the corresponding control signal in such a way as to tune the supply voltage of the selected amplifier so as to minimize the backoff of this amplifier.

The invention is not limited to the embodiments and modes of implementation just described but embraces all variations thereof. Thus, it is especially advantageous also to monitor the accuracy of the output power. In this regard, referring again to FIG. 1, in which the additional means of this embodiment have been represented by dashed lines, it may be seen that there is provided a monitoring block MCPS, receiving the level of the output power delivered by the amplifier MAGV and the control signal CTPG arising from the power preset received by the terminal, and delivering, after comparison of the two inputs, the gain control signal for the amplifier MAGV. The presence of such a monitoring block is also conceivable in the embodiments illustrated in FIGS. 2 and 12. In the embodiment of FIG. 2, the gain control signal would then be delivered, for example, to a variable-gain preamplifier.

That which is claimed is:

1. A process for monitoring a transmission power of a remote terminal operating within a transmission power range, the remote terminal comprising a variable-gain amplifier covering the transmission power range, the process comprising:
adjusting the transmission power by tuning a gain and a supply voltage of the variable-gain amplifier as a function of power information received by the remote terminal.

2. A process according to claim 1, wherein the remote terminal comprises a cellular mobile telephone.

3. A process according to claim 1, wherein the variable-gain amplifier comprises at least two individually selectable power amplifiers capable together of covering the transmission power range, each power amplifier having an operating zone that is different from the operating zone of the other power amplifier and a common operating zone that is the same for each power amplifier, and one of the power amplifiers covers the transmission power range for the received power information corresponding to a power level in the common operating zone; and further comprising:
verifying whether the received power information corresponds to a currently selected power amplifier, and if not, then selecting the other power amplifier and tuning a supply voltage thereof as a function of the power information received.

4. A process according to claim 3, wherein at least one of the power amplifiers has a variable gain, and if selected, further comprising tuning a gain thereof as a function of the power information received.

5. A process according to claim 1, wherein the variable-gain amplifier comprises at least two individually selectable power amplifiers capable together of covering the transmission power range, each power amplifier having an operating zone that is different from the operating zone of the other power amplifier and a common operating zone that is the same for each power amplifier, and one of the power amplifiers covers the transmission power range for the received power information corresponding to a power level in the common operating zone; and further comprising:
verifying whether the received power information corresponds to a currently selected power amplifier, and if not, then defining a switching time range that extends from when the power information was received to a predetermined duration compatible with limits of the common operating zone; and
defining an interruption time range within the switching time range as a function of predetermined criteria for interrupting transmission.

6. A process according to claim 5, further comprising continuing adjusting the transmission power of the selected power amplifier until the interruption time range occurs, and if new power information received before the occurrence of the interruption time range does not correspond to the power amplifier currently selected; then disabling transmission of the selected power amplifier during the interruption time range, and selecting the other power amplifier for transmission.

7. A process according to claim 5, wherein at least one of the power amplifiers has a variable gain; and if selected, further comprising tuning a gain thereof as a function of the power information received.

8. A process according to claim 5, wherein the power information is defined by a plurality of chips and is transmitted within successive frames, with each frame being divided into a predetermined number of slots.

9. A process according to claim 8, wherein a duration of the switching range is within a range of about 4 to 8 slots; and wherein a duration of the interruption time range is within a range of about 2 to 4 chips.

10. A process according to claims 5, wherein the predetermined criteria for interrupting transmission comprises at least one predetermined event occurring during a transmission, the at least one predetermined event having an impact on a binary error rate when the transmission is interrupted during the occurrence of this predetermined event; and further comprising analyzing characteristics of the transmission for detecting this predetermined event within the switching range, and if detected, then placing the interruption time range during the occurrence of this predetermined event.

11. A process according to claim 10, wherein the at least one predetermined event comprises a plurality of predetermined events; and further comprising ordering the plurality of predetermined events based upon a predetermined order of priority as a function of their respective impacts on the binary error rate when the transmission is interrupted during the occurrence of one of these plurality of predetermined events; and wherein analyzing the characteristics is based upon the order of priority for detecting the plurality of predetermined events within the switching range, and if one of the predetermined events is detected, than placing the interruption time range during the occurrence of a first predetermined event detected in the order of priority.

12. A process according to claim 11, wherein the power information received comprises data and monitoring indications, and is transmitted within successive frames, with each frame being subdivided into a predetermined number of slots; and wherein the monitoring indications comprise feedback information and transport format combination indicators.

13. A process according to claim 12, wherein the plurality of particular events comprise, in descending order of priority, the following:
  empty intervals during a compressed mode of transmission;
  intervals in which the transmission has to be interrupted in a gated mode of transmission;
  sections of silence intervals in a discontinuous mode of transmission, during which neither feedback information nor transport format combination indicators are transmitted;
  sections of the intervals during which data having a high spreading factor are transmitted without transmitting either feedback information or transport format combination indicators;
  sections of the intervals during which data having a low spreading factor are transmitted without transmitting either feedback information or transport format combination indicators; and
  sections of the intervals during which feedback information or transport format combination indicators are transmitted.

14. A remote terminal of a wireless communication system comprising:
  an antenna;
  receiver circuitry connected to said antennas;
  transmitter circuitry having a transmission power range;
  a power amplification stage connected between said transmitter circuitry and said antenna and comprising a variable-gain amplifier covering the transmission power range; and
  a processing stage connected to said receiver circuitry and to said power amplification stage for adjusting the transmission power by tuning a gain and a supply voltage of said variable-gain amplifier as a function of power information received by said receiver circuitry.

15. A remote terminal according to claim 14, wherein said variable-gain amplifier comprises at least two individually selectable power amplifiers capable together of covering the transmission power range, each power amplifier having an operating zone that is different from the operating zone of the other power amplifier and a common operating zone that is the same for each power amplifier; and wherein said power amplification stage further comprises a selection circuit for connecting an output of said transmission circuitry to an input of one of said power amplifiers in response to a corresponding selection information item.

16. A remote terminal according to claim 15, wherein said processing stage comprises:
  a memory for storing a correspondence table associating one of said power amplifiers with the transmission power range;
  a monitoring circuit connected to said memory for verifying whether the received power information corresponds to a currently selected power amplifier; and
  a control circuit connected to said monitoring circuit and to said selection circuit for providing the selection information item to said selection circuit for selecting the other power amplifier if the received power information does not correspond to the currently selected power amplifier, and for tuning a supply voltage of the selected power amplifier as a function of the power information received.

17. A remote terminal according to claim 16, wherein at least one of said power amplifiers has a variable gain; and wherein said control circuit tunes a gain of said selected power amplifier as a function of the power information received.

18. A remote terminal according to claim 15, wherein said processing stage comprises:
  a memory for storing a correspondence table associating one of said power amplifiers with the transmission power range;
  a monitoring circuit connected to said memory for verifying whether the received power information corresponds to a currently selected power amplifier, and if not, then defining a switching time range that extends from when the power information was received to a predetermined duration compatible with limits of the common operating zone, and defining an interruption time range within the switching time range as a function of predetermined criteria for interrupting transmission; and
  a control circuit connected to said monitoring circuit and to said selection circuit for continuing adjustment of the transmission power of the selected power amplifier until the interruption time range occurs, and if new power information received before the occurrence of the interruption time range does not correspond to the power amplifier currently selected, then disabling transmission of the selected power amplifier during the interruption time range, and selecting the other power amplifier for transmission by providing the selection information item to said selection circuit, and for tuning a supply voltage of the selected power amplifier as a function of the power information received.

19. A remote terminal according to claim 18, wherein the power information is defined by a plurality of chips and is transmitted within successive frames, with each frame being divided into a predetermined number of slots.

20. A remote terminal according to claim 19, wherein a duration of the switching range is within a range of about 4 to 8 slots; and wherein a duration of the interruption time range is within a range of about 2 to 4 chips.

21. A remote terminal according to claim 18, wherein the predetermined criteria for interrupting transmission comprises at least one predetermined event occurring during a transmission; the at least one predetermined event having an impact on a binary error rate when the transmission is interrupted during the occurrence of this predetermined event; and wherein said monitoring circuit analyzes characteristics of the transmission for detecting this predetermined event within the switching range, and if detected, then placing the interruption time range during the occurrence of this predetermined event.

22. A remote terminal according to claim 21, wherein the at least one predetermined event comprises a plurality of predetermined events; and wherein said monitoring means orders the plurality of predetermined events based upon a predetermined order of priority as a function of their respective impacts on the binary error rate when the transmission is interrupted during the occurrence of one of these plurality of predetermined events, and analyzes the characteristics based upon the order of priority for detecting the plurality of predetermined events within the switching range, and if one of the predetermined events is detected, than placing the interruption time range during the occurrence of a first predetermined event detected in the order of priority.

23. A remote terminal according to claim 22, wherein the power information received comprises data and monitoring indications, and is transmitted within successive frames, with each frame being subdivided into a predetermined number of slots; and wherein the monitoring indications comprise feedback information and transport format combination indicators.

24. A remote terminal according to claim 23, wherein the plurality of particular events comprise, in descending order of priority, the following:
   empty intervals during a compressed mode of transmission;
   intervals in which the transmission has to be interrupted in a gated mode of transmission;
   sections of silence intervals in a discontinuous mode of transmission, during which neither feedback information nor transport format combination indicators are transmitted;
   sections of the intervals during which data having a high spreading factor are transmitted without transmitting either feedback information or transport format combination indicators;
   sections of the intervals during which data having a low spreading factor are transmitted without transmitting either feedback information or transport format combination indicators; and
   sections of the intervals during which feedback information or transport format combination indicators are transmitted.

25. A remote terminal according to claim 14, wherein said power amplification stage comprises a controllable chopped power supply for providing a varying supply voltage to said variable-gain amplifier.

26. A remote terminal according to one of claim 14, further comprising a power level circuit connected between said processing stage and said power amplification stage for monitoring power transmitted by said variable-gain amplifier based upon a signal present at an output of said power amplification stage and the received power information.

27. A remote terminal according to claim 14, wherein the remote terminal comprises a cellular mobile telephone.

28. A cellular mobile telephone comprising:
   an antenna;
   receiver circuitry connected to said antenna;
   transmitter circuitry having a transmission power range;
   a power amplification stage connected between said transmitter circuitry and said antenna and comprising at least two individually selectable power amplifiers capable together of covering the transmission power range, each power amplifier having an operating zone that is different from the operating zone of the other power amplifier and a common operating zone that is the same for each power amplifier; and
   a processing stage connected to said receiver circuitry and to said power amplification stage for adjusting the transmission power by tuning a gain and a supply voltage of a selected power amplifier as a function of power information received by said receiver circuitry.

29. A cellular mobile telephone according to claim 28, wherein said power amplification stage further comprises a selection circuit for connecting an output of said transmission circuitry to an input of one of said power amplifiers in response to a corresponding selection information item.

30. A cellular mobile telephone according to claim 29, wherein said processing stage comprises:
   a memory for storing a correspondence table associating one of said power amplifiers with the transmission power range;
   a monitoring circuit connected to said memory for verifying whether the received power information corresponds to a currently selected power amplifier; and
   a control circuit connected to said monitoring circuit and to said selection circuit for providing the selection information item to said selection circuit for selecting the other power amplifier if the received power information does not correspond to the currently selected power amplifier, and for tuning a supply voltage of the selected power amplifier as a function of the power information received.

31. A cellular mobile telephone according to claim 30, wherein at least one of said power amplifiers has a variable gain; and wherein said control circuit tunes a gain of said selected power amplifier as a function of the power information received.

32. A cellular mobile telephone according to claim 28, wherein said processing stage comprises:
   a memory for storing a correspondence table associating one of said power amplifiers with the transmission power range;
   a monitoring circuit connected to said memory for verifying whether the received power information corresponds to a currently selected power amplifier, and if not, then defining a switching time range that extends from when the power information was received to a predetermined duration compatible with limits of the common operating zone, and defining an interruption time range within the switching time range as a function of predetermined criteria for interrupting transmission; and
   a control circuit connected to said monitoring circuit and to said selection circuit for continuing adjustment of the transmission power of the selected power amplifier until the interruption time range occurs, and if new power information received before the occurrence of the interruption time range does not correspond to the power amplifier currently selected, then disabling transmission of the selected power amplifier during the interruption time range, and selecting the other power amplifier for transmission by providing the selection information item to said selection circuit, and for tuning a supply voltage of the selected power amplifier as a function of the power information received.

33. A cellular mobile telephone according to claim 32, wherein the predetermined criteria for interrupting transmission comprises at least one predetermined event occurring during a transmission, the at least one predetermined event having an impact on a binary error rate when the transmission is interrupted during the occurrence of this predetermined event; and wherein said monitoring circuit analyzes characteristics of the transmission for detecting this predetermined event within the switching range, and if detected, then placing the interruption time range during the occurrence of this predetermined event.

34. A cellular mobile telephone according to claim 28, wherein said power amplification stage comprises a controllable chopped power supply for providing a varying supply voltage to said power amplifiers.

35. A cellular mobile telephone according to one of claim 28, further comprising a power level circuit connected between said processing stage and said power amplification stage for monitoring power transmitted by said power amplifiers based upon a signal present at an output of said power amplification stage and the received power information.

* * * * *

UNITED STATES PATENT AND TRADEMARK OFFICE
CERTIFICATE OF CORRECTION

PATENT NO. : 7,096,035 B2
APPLICATION NO. : 10/113958
DATED : August 22, 2006
INVENTOR(S) : Gouessant et al.

It is certified that error appears in the above-identified patent and that said Letters Patent is hereby corrected as shown below:

Title Page, Section 57, Line 3
Delete: "celluar"
Insert: --cellular--

Column 7, Line 32
Delete: "illustrate"
Insert: --illustrates--

Column 11, Line 53
Delete: "TPCI"
Insert: --TPCi--

Column 11, Line 65
Delete: "TPCI"
Insert: --TPCi--

Column 14, Line 47
Delete: "transort"
Insert: --transport--

Column 15, Line 7
Delete: "range these"
Insert: --range in these--

Column 17, Line 22
Delete: "than"
Insert: --then--

Column 17, Line 57
Delete: "antennas"
Insert: --antenna--

Column 19, Line 8
Delete: "transmission; the"
Insert: --transmission, the--

Column 19, Line 26
Delete: "than"
Insert: --then--

Column 19, Line 62
Delete: "one of"

UNITED STATES PATENT AND TRADEMARK OFFICE
CERTIFICATE OF CORRECTION

PATENT NO.       : 7,096,035 B2
APPLICATION NO.  : 10/113958
DATED            : August 22, 2006
INVENTOR(S)      : Gouessant et al.

It is certified that error appears in the above-identified patent and that said Letters Patent is hereby corrected as shown below:

Column 22, Line 8        Delete: "one of"

Signed and Sealed this

Thirty-first Day of July, 2007

JON W. DUDAS
*Director of the United States Patent and Trademark Office*